R. E. GALVIN & H. C. SCHUMACHER.
CORN PLANTER.
APPLICATION FILED JULY 18, 1917.
1,257,839.
Patented Feb. 26, 1918.
3 SHEETS—SHEET 1.
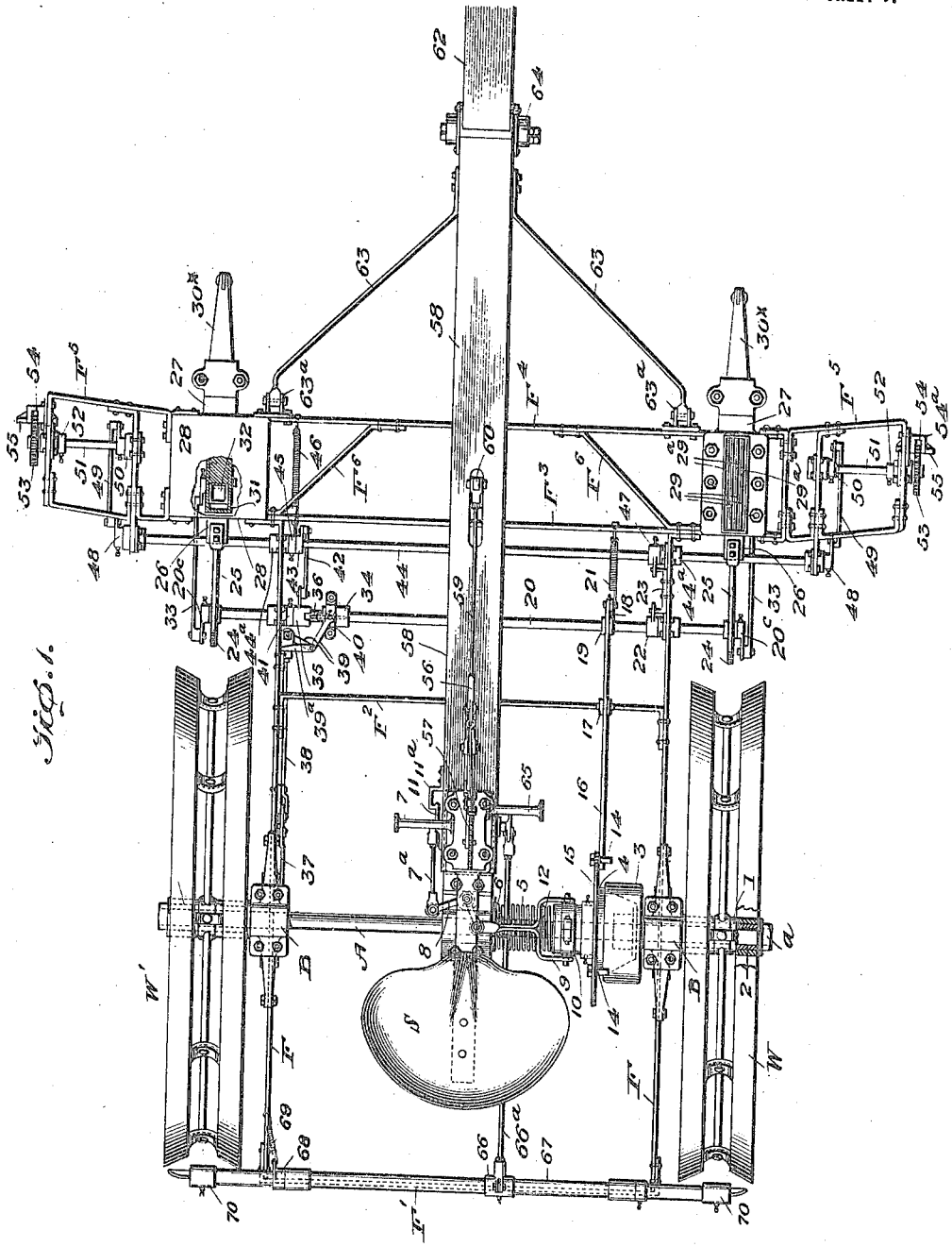
Inventors:
Robert E. Galvin and
Herbert C. Schumacher
BY Alexander Powell
Attorneys

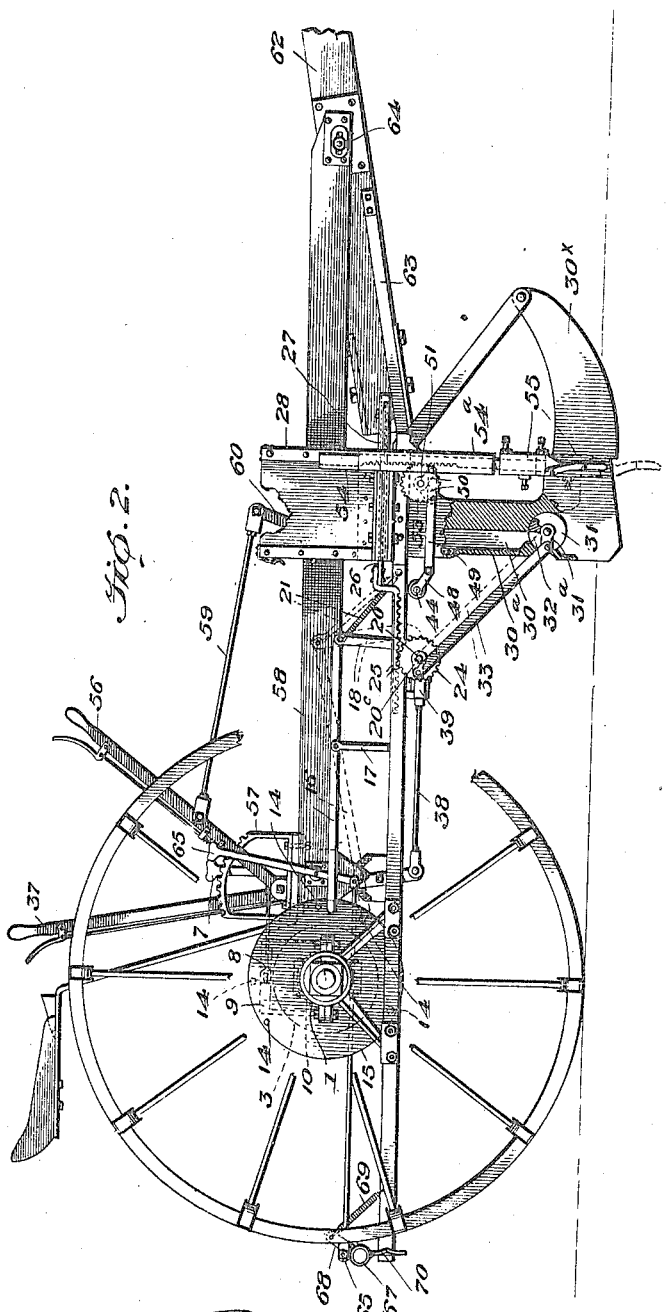

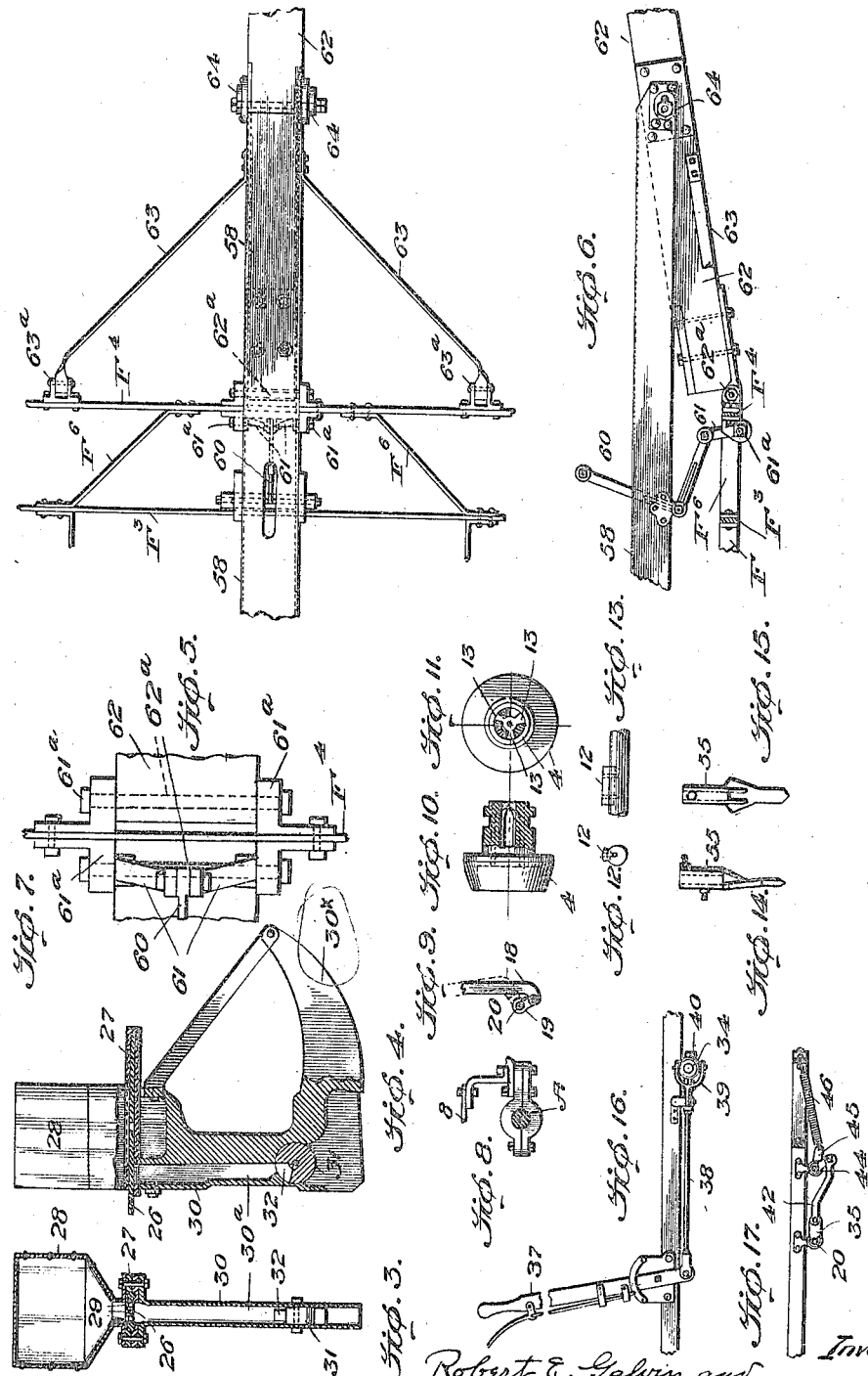

UNITED STATES PATENT OFFICE.

ROBERT E. GALVIN AND HERBERT C. SCHUMACHER, OF ROCK ISLAND, ILLINOIS.

CORN-PLANTER.

1,257,839.

Specification of Letters Patent.

Patented Feb. 26, 1918.

Application filed July 18, 1917. Serial No. 181,303.

*To all whom it may concern:*

Be it known that we, ROBERT E. GALVIN and HERBERT C. SCHUMACHER, citizens of the United States, residing at Rock Island, in the county of Rock Island and State of Illinois, have invented certain new and useful Improvements in Corn-Planters; and we hereby declare that the following is a full, clear, and exact description thereof, reference being had to the accompanying drawings, which form part of this specification.

This invention is a novel improvement in corn planters and its object is to provide an efficient planting machine having novel means for actuating the seed dropping devices; novel marking devices; novel means for lifting the furrow devices and other novel features of construction and combinations of parts which will be hereinafter set forth in detail.

In the accompanying drawings we have illustrated a complete planter embodying each and all of the novel features of the invention, and which in connection with the accompanying description of such machine will enable others to manufacture and use the same; the essential features and combination of parts for which protection is desired being set forth in the claims following this description.

In said drawings:

Figure 1 is a top plan view of the complete machine.

Fig. 2 is a side elevation thereof, partly in section.

Fig. 3 is a detail vertical section through the runner and seed box slide.

Fig. 4 is a detail section of the same parts at right angles to Fig. 3.

Fig. 5 is a detail top plan view of part of the connection between the steel tongue or back bone of the frame and the wooden or pivoted tongue.

Fig. 6 is a side view of Fig. 5.

Fig. 7 is a detail plan view of the hinged connection between the lever 61 and the tongue 62.

Figs. 8, 9, 10, 11, 12, 13, 14, 15, 16 and 17 are details.

The main frame of the machine may be of any suitable construction, and is preferably made of bar iron and as shown is composed of side members F which are supported upon the main axle A by boxes or bearings B. Members F are connected in rear of the axle by a transverse bar F', and in front of the axle by transverse bars $F^2$ and $F^3$. In front of bar $F^3$ is a parallel bar $F^4$ and to the bars $F^3$ and $F^4$ are attached the seed boxes or cans 28, which may be of any suitable construction, with the exceptions hereinafter noted, and at the outer sides of these boxes 28 are attached metallic frames $F^5$ in which the marking devices are mounted.

The front bars $F^3$ and $F^4$ of the frame are connected by suitable brace bars $F^6$, and the front bar $F^4$ of the frame has a hinged connection to the rear end of the wooden or pivoted tongue 62 as hereinafter explained, and also has a hinged connection with the main tongue member or backbone 58 of the frame, said member 58 extending longitudinally and centrally of the frame and connected at its rear end of the axle A and the tongue 62, being pivotally connected to the front end of member 58 as indicated at 64.

The runners 30 are attached to the frame beneath the seed boxes 28 and are provided with furrow openers $30^x$, operating as usual. The frame is mounted upon the axle A which is carried by wheels W and W', which may be of any suitable construction.

In this machine all the automatic mechanical operations are performed by power derived from the wheels, preferably from the right-hand wheel W by means hereinafter explained, the device being set into or out of operation by means of a hand lever which throws one clutch member into or out of engagement with another clutch member operated by the wheel.

In the example shown the hub 1 of the wheel W is fastened to a sleeve 2 on axle A, and to the inner end of this sleeve is fastened a female clutch member 3. Sleeve 2 can turn freely on axle A and in the adjacent bearing B on the right side of the frame, and said sleeve is held in place on the axle by a washer and nut *a* on the ends of the axle.

Slidably mounted on the axle and free to rotate thereon is a male friction member 4 which is pressed toward the female member by a coil spring 5 interposed between member 4 and a collar 6 fastened to the axle A. The clutch is controlled by a foot lever 7 pivoted on the tongue member 58. Said foot lever being connected by a link $7^a$ to one arm of a bell crank lever 8 pivoted on member 58, the other arm of said lever 8 being connected to the clutch shifting fork 9 which engages a collar 10 loosely surrounding the neck of the clutch member 4. The foot lever 7 is guided by a bar 11 which has a notch or slot 11ᵃ at one end into which the lever 7 can be engaged and hold the clutch disengaged or "free" when the lever 7 is disengaged by the foot.

A key or pin 12, (see Figs. 1, 12, and 13), is fastened to the axle A adjacent the neck of the clutch member 4 which is disengaged therefrom when the clutch members are in engagement. The clutch member 4 has three slots or notches 13 in its outer end which are preferably beveled adjacent the key 12, said notches conforming to the shape of the key 12 and adapted to engage therewith. The outer ends or mouths of these slots are preferably beveled to facilitate entrance of the key 12 thereinto when the clutch is thrown out regardless of the position of the slots 13 relative to the key 12 when the clutch member 4 moves backward or inward, to disengage member 3.

To the clutch member 4 is rigidly attached a disk 15 which is provided with three equidistant lugs or pins 14. These lugs or pins 14 are adapted to engage the rear end of the trip lever 16 which is pivoted at 17 on a support attached to the bar F² of the frame. The pins 14 are of such length that they will engage the trip lever 16 when the clutch members are in engagement but will not strike the trip lever 16 when the clutch members are disengaged. The slots 13 are made so that they readily engage with the key 12 and insure the correct relative position of lugs or pins 14 on a disk 15 hereinafter referred to relative to a trip lever 16.

To the front end of the lever 16 is pivotally connected one end of a link 18, the other end of which link is preferably bent rearwardly and connected to an arm 19 fast to a shaft 20 (see Figs. 1, 2 and 9). A coil spring 21 is fastened at one end to the upper end of link 18 and its other end is fastened to an adjacent fixed point on the frame F. The coil spring 21 acts to return to a position of rest shaft 20 and all parts connected therewith. A stop arm 22 is fastened to shaft 20 in position to engage with a stop 23 attached to the frame and arrest shaft 20 and all parts connected therewith in rest position.

A gear 24 is fastened to each end of the shaft 20; and such gear 24 meshes with a rack 25 attached to a sliding feed plate 26 operating in a housing 27 which forms the bottom of the adjacent seed box 28. This feed plate 26 preferably has three longitudinal grooves 29 in its upper surface, and in each groove is a hole 29ᵃ large enough to admit the desired number of seed kernels. The grooves 29 in the seed plate line up the kernels so that they will enter the holes 29ᵃ readily. When the feed slot 26 is in normal, rest, position in the bottom of the seed box 28, the seed kernels can work into the holes 29ᵃ but cannot pass through as they will rest on the bottom of the housing 26 upon which the seed plate lies.

When the rear end of lever 16 is depressed by the engagement of a pin 14 therewith, it will through the described connections rock shaft 20, and, when the shaft is thus rocked the gear 24 thereon will operate racks 25 and move the seed plates 26 out, or back, bringing the holes 29ᵃ therein over the feed channel 30ᵃ in the runner-casting 30 and the kernels will drop through the channel onto a dropper 31 mounted in the casting at the lower end of the channel 30ᵃ near the bottom of the runner. Each dropper 31 is rocked at the proper time to drop the seed by means of an arm 31ᵃ connected to the rocker and in turn connected by a link 33 with an arm 20ᶜ on shaft 20.

The parts are so arranged that the dropper 31 is turned each time that the related slide 26 is brought back. At the time when slide 26 is brought back to allow the kernels in openings 29ᵃ to a fall into the channel in the runner 30, the pocket 32 in the dropper 31 is turned downward. When at rest position pocket 32 is uppermost and receives the kernels just discharged from the sliding plate 26. When the slide 26 moves back dropper 31 is moved, so that pocket 32 is turned down to allow the kernels therein to drop into the furrow made by the opener 30ˣ, and the kernels just dropped from the seed slide into the channel 30ᵃ are caught and retained. In this manner seed will be discharged at the proper times and each time that the lever 16 is rocked by a pin 14.

If for example, the wheel W is ten feet six inches in circumference, one revolution of the disk 15 when actuated by the wheel W will oscillate lever 16 three times; thus for each revolution of the wheel W three hills of corn may be planted, the hills being three feet and six inches apart. Of course these proportions may be varied so as to plant hills at any desired distances apart, and the invention is not restricted to any particular size of wheel nor to any particular number of pins or lugs 14 on the disk 15.

*The marking devices.*

On shaft 20 is a sliding member 34 of a preferably square-jawed clutch; which member 34 is caused to turn with shaft 20 by a key 36 but is movable freely into and out of engagement with an opposed clutch member 35 loosely mounted on the shaft 20 and having an arm which is pivotally connected by a link 36 to an arm 43 on a shaft 44 journaled in bearing-castings 44ᵃ attached to the frame.

The sliding member 34 of the clutch may be operated by a hand lever 37 pivoted on the left hand side of the frame and connected by a link 38 to one arm of a fork lever 39 which is connected to a loose collar 40 on a sliding clutch member 34, lever 39 being pivoted on a bracket 39ª attached to the frame, so that clutch 34 can be engaged or disengaged at will by properly shifting the lever 37.

The shaft 20 is prevented from moving endwise by means of the collar 22 and a collar 41 fastened thereto as indicated in Fig. 1. Shaft 44 is held in place longitudinally of the frame by means of collars 47 and 45 which are rigidly fastened thereto adjacent bearings 44ª as shown.

Casting 47 is provided with an arm which is adapted to engage member 23 and arrest shaft 44 and parts connected therewith in rest or normal position. The shaft 44 and parts connected therewith are normally held in, and returned to, rest position, by means of a spring 46 connected with the frame and to an arm on member 45, see Figs. 1 and 17.

To each end of shaft 44 are attached arms 48 each of which is connected by a link 49 to an arm 50 attached to a shaft 51 mounted in suitable bearings in the frame F⁵. The shaft 51 being kept from longitudinal play in the frames F⁵ by arm 50 and collars 52. On the outer end of each shaft 51 is a gear 53 which meshes with a vertically disposed rack 54 mounted in a suitable guide 54ª attached to a frame 52. To the lower end of each rack 54 is attached a marker 55 which may be adjustably fastened thereto by set screws or other suitable means. In the example stated the point of each marker 55 would be twenty-one inches from the center of the adjacent runner 30ª, or one-half the distance between the adjacent rows.

When shafts 51 are at rest position and runners 30 are in the ground the points of the markers 55 drag on the ground as indicated in full lines in Fig. 2 and make lines, light shallow furrows, therein. The line traced by one of the markers 55 on the outgoing trip should be followed by the same marker 55 on the return trip, and thus will cause the desired distance between adjacent rows.

When the clutch 34 is engaged with member 35 so that shaft 44 is rocked by and from shaft 20, shafts 51 will be rocked and will through the gear connections depress the markers into the ground as indicated in dotted lines in Fig. 2 and cause them to dig holes three feet six inches apart or the desired distance between the hills; this latter operation however is intended to be performed only at the beginning and end of each row in order that the operator can tell where the first and last hills in the rows were planted.

*Frame adjusting devices.*

The forward part of the frame to which the runners 30 are attached is raised and lowered by a hand lever 56 pivoted on the tongue member 58 and adapted to be locked to a sector 57 in the usual manner. Hand lever 56 is connected by a rod 59 to one end of a bell crank 60 which is pivoted at its center to the tongue member 58 and projects through a slot therein. The lower arm of the bell crank 60 is connected by two links 61, 61, to castings 61ª bolted to the frame member F⁴ (see Figs. 5, 6 and 7).

The inner end of the front tongue 62 is pivotally bolted to the frame at the same point as at 62ª in order to get a direct pull on the frame near the runners 30. Braces 63 are bolted to the tongue 62 and run back to and are pivotally connected with the frame at 63ª in order to keep the frame in the right position. The tongue 64 is also bolted to the inner tongue member 58 at 64, the bolt 64 acting as a hinge joint.

*The mud scrapers.*

The mud scrapers 70 are attached to a rod 67 mounted on the rear bar of the frame, said rod having an arm 66 pivotally connected to one end of a link 66ª, the other end of which is connected to a foot lever 65, which is pivoted to the tongue member 58 adjacent the driver's seat S. A stop arm 68 on the scraper shaft 67 is arranged to engage the frame when at rest position, and a coil spring 69 normally holds the scrapers in rest position, away from the wheels.

*Operation.*

When the machine is in position to begin the planting the operator should first throw in clutch 34 which operates the marker 55. Then move the tongue lift lever 56 to drop the furrow openers to the required depth for planting corn. Then release foot lever 7 from the notch in guide 11 to throw in the main clutch 4. Then start the machine forward, and after it has dropped two or three hills pull lever 37 and disengage clutch 34. The markers 55 will then drag on the ground making lines one of which lines should be followed by the same marker making it on the return trip.

When about at the end of the row the operator should again throw in clutch 34 which will cause the marker to make holes in the ground with which the markers must be brought into register on beginning the return trip. At the end of the row lever 56 should be moved so as to raise the markers and runners 30 clear of the ground while turning around. After turning around get the marker 55 directly over the hole made by the near marker then drop the frame, lowering the markers and furrow openers to the regular depth for planting, and proceed as on the previous row.

The markers 55 should be set ahead of the channel 30ª exactly one-half the distance the wheel travels before the drop is completed. The markers 55 make holes in the ground at the same time the corn is dropped. After turning around the marker 55 should be brought directly above the hole. This determines the point where the clutch 4 should be thrown "in" in order that the drops on the return trip will be directly in line with the drops in the row just planted.

In the drawings the dotted lines indicate the positions of the parts at the end of their active strokes and the full lines show the parts in rest position. At the end of the planting operation when the clutch 4 is disengaged the disk 15 with the pins 14 thereon automatically sets itself in correct position to begin the next planting operation when the clutch is again thrown into engagement. This is due to the key 12 on the axle which causes the clutch member 4 to automatically shift itself, when disengaged from the clutch member 3, into position to reëngage and resume operation immediately at the correct point.

What we claim is:

1. In a corn planter, a frame, seed feeding devices, a rock-shaft for operating the seed feeding devices, an oscillating lever pivoted on the frame, connections between one end of said lever and said rock-shaft, a supporting wheel, a clutch member operated by the wheel, a slidable clutch member opposite the first member, manually controlled means for disengaging the clutch, a spring for throwing the clutch into engagement, means operated by the clutch to actuate the rock-shaft when the clutch is engaged, and a key adjacent the sliding clutch member adapted to position the latter relatively to the other clutch member when disengaged therefrom, so that when the clutch is reëngaged the seed will be dropped at the proper point.

2. In a corn planter, a frame, seeding devices, a rock-shaft for operating the seeding devices, an oscillating lever pivoted on the frame, connections between one end of said lever and said rock-shaft, a supporting wheel, a clutch member operated by said wheel, a slidable clutch member opposite the first member, manually controlled means for disengaging the clutch, a spring for throwing the clutch into engagement, means connected with the slidable clutch member adapted to operate the rock-shaft when the clutch is engaged, markers mounted on the frame adjacent the seed boxes, devices for raising and lowering the markers, a second rock-shaft beside the first rock-shaft for operating said marker devices, a loose member on the first rock-shaft, connections between this loose member and an arm on the second rock-shaft, a second clutch member keyed on the first rock-shaft adapted to engage the loose member, and manually controlled means for engaging the second clutch member with the loose member to cause the operation of the markers.

3. In a corn planter, a frame, seed boxes on the frame, seed slides, a rock-shaft for operating the slides, an oscillating lever pivoted on the frame, connections between one end of said lever and said rock-shaft, a supporting wheel, a clutch member connected with said wheel, a slidable clutch member opposite the first member, manually controlled means for disengaging the clutch, a spring for throwing the clutch into engagement, means connected with the slidable clutch member adapted to cause said oscillating lever to operate the rock-shaft when the clutch is engaged, and a key adjacent the sliding clutch member adapted to position the latter relatively to the other clutch member when disengaged therefrom so that when the clutch is reëngaged the seed will be dropped at the proper point.

4. In a corn planter, a frame, seed boxes on the frame, seed slides, a rock-shaft for operating the slides, an oscillating lever pivoted on the frame, connections between one end of said lever and said rock-shaft, a supporting wheel, a clutch member connected with said wheel, a slidable clutch member opposite the first member, manually controlled means for disengaging the clutch, a spring for throwing the clutch into engagement, means connected with the slidable clutch member to engage said oscillating lever to cause it to operate the rock-shaft when the clutch is engaged, markers mounted on the frame adjacent the seed boxes, devices for raising and lowering the markers, a second rock-shaft beside the first rock-shaft for operating said marker devices, a loose member on the first rock-shaft, connections between this loose member and an arm on the second rock-shaft, a second clutch member keyed on the first rock-shaft adapted to engage the loose member, and manually controlled means for engaging the second clutch member with the loose member to cause the operation of the markers.

5. In a corn planter, the combination of a frame, a wheeled axle supporting the frame, seed boxes on the frame, feed slides, a rocker-shaft for operating the slides, an oscillating lever pivoted on the frame, a connection between one end of this lever and said rock-shaft for rocking the latter, a clutch member connected with one wheel, a slidable clutch member on the axle opposite the first member, means for disengaging the clutch, a spring for throwing the clutch into engagement, pins connected with the slidable clutch member adapted to successively engage the adjacent end of said oscillating lever when the clutch is engaged to cause it to operate the rock-shaft, and a key on the axle adjacent the sliding clutch member to position the latter relatively to the other clutch member when the clutch is disengaged so that when the clutch is reëngaged the seed will be dropped at the proper points.

6. In a corn planter, the combination of a frame, a wheeled axle supporting the frame, seed boxes on the frame, seed slides, a rocker-shaft for operating the seed slides, an oscillating lever pivoted on the frame, connections between one end of this lever and said rock-shaft for rocking the latter, a clutch member connected with one wheel, a slidable clutch member on the axle opposite the first member, a foot lever and connections for disengaging the clutch, a spring for throwing the clutch into engagement, pins connected with the slidable clutch member adapted to successively engage the adjacent end of said oscillating lever when the clutch is engaged to cause it to operate the rock-shaft, markers adjacent the seed boxes, a rocker-shaft beside the first rock-shaft for operating the marker actuating devices, a second clutch member loose on the first rock-shaft, connections between this second clutch member and an arm on the second rock-shaft, a third clutch member keyed on the first rock-shaft adapted to engage the loose clutch member, and means for throwing the third clutch member into engagement with the second clutch member to cause the operation of the markers.

7. In a corn planter, the combination of a frame, a wheeled axle supporting the frame, seed boxes on the frame, seed slides, a rocker-shaft for operating the slides, an oscillating lever pivoted on the frame, link connections between one end of this lever and said rock-shaft for rocking the latter, a clutch member connected with one wheel, a slidable clutch member on the axle opposite the first member, a foot lever and connections for disengaging the clutch, a spring for throwing the clutch into engagement, a disk connected with the slidable clutch member provided with pins adapted to successively engage the adjacent end of said oscillating lever when the clutch is engaged to cause it to operate the rock-shaft, and a key on the axle adjacent the sliding clutch member to position the latter relatively to the other clutch member when the clutch is disengaged so that when the clutch is reëngaged the seed will be dropped at the proper points.

8. In a corn planter, the combination of a frame, a wheeled axle supporting the frame, seed boxes on the frame, seed dropping slides, a rocker-shaft for operating the seed slides, an oscillating lever pivoted on the frame, link connections between one end of this lever and said rock-shaft for rocking the latter, a clutch member connected with one wheel, a slidable clutch member on the axle opposite the first member, a foot lever and connections for disengaging the clutch, a spring for throwing the clutch into engagement, a disk connected with the slidable clutch member provided with pins adapted to successively engage the adjacent end of said oscillating lever when the clutch is engaged to cause it to operate the rock-shaft, markers adjacent the seed boxes, a rock-shaft beside the first rock-shaft for operating the marker actuating devices; a second clutch member loose on the first rock-shaft, connections between this second clutch member and an arm on the second rock-shaft, a third clutch member keyed on the first rock-shaft adapted to engage the loose clutch member, and manually controlled means for throwing the said third clutch member into engagement with the second clutch member to cause the operation of the markers.

9. In a planter, a seed box, a feed slide therein, a rack bar connected with said slide, a pinion engaging said rack, a rock-shaft carrying said pinion, an oscillating lever for rocking said shaft, and means to operate said lever.

10. In a planter a seed box, a seed slide therein, a rack bar connected with said slide, a pinion engaging said rack, a rock-shaft carrying said pinion, an oscillating lever for rocking said shaft, a rotary member adapted to actuate said lever, a wheel, and manually controlled means for operating said member from said wheel.

11. In a planter a seed box, a seed slide therein, a rack bar connected with said slide, a pinion engaging said rack, a rock-shaft carrying said pinion, an oscillating lever for rocking said shaft, means for operating said lever; a furrow opener beneath the seed box having a seed channel, a dropper closing the said channel, and operative connections between said dropper and said rock-shaft.

12. In a planter a seed box, a seed slide therein, a rack bar connected with said slide, a pinion engaging said rack, a rock-shaft carrying said pinion, an oscillating lever for rocking said shaft, a rotary member adapted to operate said lever, a wheel, and manually controlled means for operating said member from said wheel; with a furrow opener beneath the seed box having a seed channel, a dropper closing the lower end of said channel, and operative connections between said dropper and said rock-shaft.

13. In a planter, a marking device comprising a vertically movable bar, a marker on the lower end thereof, a rock-shaft and connections for actuating said bar, and means for operating said rock-shaft; a second rock-shaft, a loose clutch member on said second rock-shaft, connections between said loose clutch member and the first rock-shaft, a clutch member splined on the second rock-shaft, means for engaging said clutch members, and means for rocking the first rock shaft.

14. In a planter, a marking device comprising a vertically movable rack bar, a marker on the lower end thereof, a pinion engaging said rack bar, a rock-shaft and connections for actuating said pinion, and means for operating said rock-shaft, a second rock-shaft, a loose clutch member on said second rock-shaft, connections between said loose clutch member and the first rock-shaft, a clutch member splined on the second rock shaft, manually controlled means for engaging said clutch members and means for rocking the first rock-shaft.

15. In combination, a frame, seed boxes thereon, seed slides in said boxes, a rock-shaft, connections for operating said slides from said rock-shaft, an oscillating lever pivoted on the frame, and connections between one end of said lever and said rock-shaft; with an axle supporting the frame, a sleeve on said axle, a wheel connected with said sleeve, a clutch member on said sleeve, an opposed slidable clutch member, a disk on the slidable clutch member, and pins on said disk adapted to engage the oscillating lever.

16. In combination a frame, seed boxes thereon, seed slides in said boxes, a rock shaft, connections for operating said slides from said rock shaft, an oscillating lever pivoted on the frame, and connections between one end of said lever and said rock-shaft; with an axle supporting the frame, a sleeve on said axle, a wheel connected with said sleeve, a clutch member on said sleeve, an opposed clutch member slidable on the axle, a disk on the slidable clutch member, pins on said disk adapted to engage the oscillating lever, a key adapted to position the slidable clutch member on the sleeve, and a spring for engaging the clutch members.

17. In combination, a frame, seed boxes thereon, seed slides in said boxes, a rock-shaft, connections for operating said slides from said rock shaft, an oscillating lever pivoted on the frame, and connections between one end of said lever and said rock shaft; with an axle supporting the frame, a sleeve on said axle, a wheel connected with said sleeve, a clutch member on said sleeve, an opposed clutch member slidable on the axle, manually operable means for shifting said opposed clutch member on the axle into and out of engagement with the first clutch member, a disk on the slidable clutch member, and pins on said disk adapted to engage the oscillating lever.

18. In combination, a frame, seed boxes thereon, seed slides in said boxes, a rock-shaft, connections for operating said slides from said rock shaft, an oscillating lever pivoted on the frame, and connections between one end of said lever and said rock-shaft; with an axle supporting the frame, a sleeve on said axle, a wheel connected with said sleeve, a clutch member on said sleeve, an opposed clutch member slidable on the axle, manually operable means for shifting said opposed clutch member on the axle into and out of engagement with the first clutch member, a disk on the slidable clutch member, pins on said disk adapted to engage the oscillating lever, a key on the axle adapted to position the slidable clutch member when disengaged from the clutch member on the sleeve, a spring for engaging the clutch members, and manually operable means for disengaging said clutch members.

19. In a corn planter, a frame, seed feeding devices, a supporting wheel, a clutch member operated by the wheel, a slidable clutch member opposite the first member, means for engaging and disengaging the clutch members, means operated by the clutch to actuate the seed feeding devices when the clutch members are engaged, and a key adjacent the sliding clutch member adapted to position the latter relatively to the other clutch member when disengaged therefrom so that when the clutch is reëngaged the seed will be dropped at the proper point.

20. In a corn planter, a frame, seed feeding devices, a rock-shaft, connections between the said rock-shaft and the seed feeding devices, a supporting wheel, a clutch member operated by the wheel, a slidable clutch member opposite the first member, means for engaging and disengaging the clutch members, means operated by the clutch to actuate the rock-shaft when the clutch members are engaged, and a key adjacent the sliding clutch member adapted to position the latter relatively to the other clutch member when disengaged therefrom so that when the clutch is reëngaged the seed will be dropped at the proper point.

21. In combination a frame, seed boxes, seed feeding devices in the boxes, a rock-shaft, connections between this rock-shaft and the seed feeding devices, a furrow opener below each box having a seed channel, a dropper at the lower end of each seed channel, and operative connections between the droppers in the furrow openers and the rock-shaft; with an oscillating lever, connections between one end of said lever and said rock-shaft, a rotatable member adapted to engage and oscillate said lever, a carrying wheel, devices for transmitting motion from the wheel to said member, and clutch means for throwing the transmitting devices into and out of effective operation.

22. In a planter the combination of a frame, a seed box, seed feeding means in the box, a furrow opener below the box having a seed channel, a rotatable dropper at the lower end of the seed channel, a rock-shaft, operative connections between this rock-shaft and the feeding means and operative connections between the droppers in the furrow openers and said rock-shaft, with an oscillating lever, connections between one end of said lever and said rock-shaft, a rotatable member adapted to engage and oscillate said lever, a carrying wheel, devices for transmitting motion from the wheel to said member, and manually controlled means for throwing the transmitting devices into and out of effective operation.

23. In a planter the combination of a frame, seed boxes, seed feeding means in the boxes, furrow openers below the boxes having seed channels, rotatable droppers in the furrow openers near the lower ends of the seed channels, a rock-shaft, connections between this rock-shaft and the seed feeding means in the boxes, links connecting the droppers in the furrow openers to arms on said rock-shaft; an oscillating lever, connections between one end of said lever and said rock-shaft, a rotatable disk having devices adapted to engage and oscillate said lever, a carrying wheel, means for transmitting motion from the wheel to said disk, and a manually controlled clutch for throwing the transmitting means into and out of effective operation.

In testimony that we claim the foregoing as our own, we affix our signatures.

ROBERT E. GALVIN.
HERBERT C. SCHUMACHER.

Copies of this patent may be obtained for five cents each, by addressing the "Commissioner of Patents, Washington, D. C."